Feb. 24, 1959     E. J. ZIELINSKI     2,874,968
ARROW HEAD
Filed Nov. 23, 1956
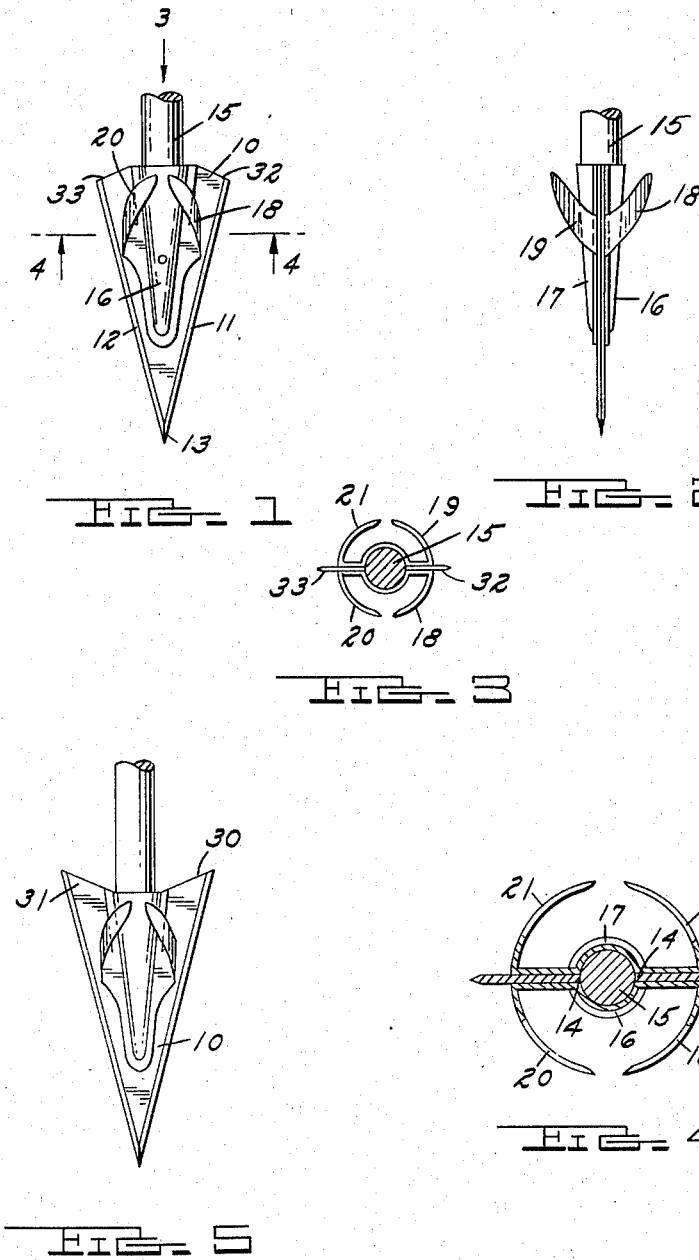

United States Patent Office

2,874,968
Patented Feb. 24, 1959

2,874,968
ARROW HEAD
Edward J. Zielinski, Royal Oak, Mich.

Application November 23, 1956, Serial No. 624,061

1 Claim. (Cl. 273—106.5)

This invention relates to arrow heads and particularly pertains to a hunting arrow adapted to cut openings in an animal body not pluggable by the shaft or shaft socket to permit profuse bleeding.

Hunting arrow heads have been employed heretofore to provide extra cuts in an animal's body to facilitate profuse bleeding, however, the several devices of the prior art have not proven entirely satisfactory inasmuch as they do not provide cuts which are not pluggable by the arrow head itself, the shaft socket, or the shaft.

With the foregoing in view, the primary object of the invention is to provide a hunting arrow head which is capable of cutting the animal body in an area which is not pluggable by the arrow head, shaft socket, or shaft.

An object of the invention is to provide arcuate cutting knives on the side of the blade adapted to cut arcuate slots in the animal body on a radius greater than the shaft socket or shaft to provide cuts not pluggable by the shaft socket or shaft.

An object of the invention is to provide a hunting arrow head which is simple in design and construction, inexpensive to manufacture, easy to mount, and which is very effective in causing bleeding for animal exhaustion and trailing purposes.

These and other objects of the invention will become apparent by reference to the description of the hunting arrow head embodying the invention taken in connection with the accompanying drawing in which:

Fig. 1 is a side elevational view of an arrow head showing the socket and arcuate knife disposition.

Fig. 2 is an edge view of the device seen in Fig. 1 taken at 90° thereto.

Fig. 3 is a top plan view of the device seen in Fig. 3.

Fig. 4 is a cross-sectional view of the device seen in Fig. 1 taken on the line 4—4 thereof and enlarged for the purpose of showing the construction more clearly; and Fig. 5 is a view of an arrow head embodying barbed tips.

Referring now to the drawing wherein like numerals refer to like and corresponding parts throughout the several views, the hunting arrow head disclosed therein to illustrate the invention comprises, a blade portion 10 having sharp edges 11 and 12 converging in a point 13 and a notched out center area 14 for receiving the shaft 15 in the area of the blade 10. Paired like socket members 16 and 17 are arcuately formed on a semi-circle and are located over the blade 10 notched out area 14 so as to constitute a socket for the shaft 15 and the semi-circular socket members 16 and 17 are welded to the blade 10. Paired arcuate knives 18 and 20 lead from the socket member 16 and are disposed on a radius greater than the socket 16 so as to overlie the socket 16 in spaced relationship and the semi-circular socket member 17 is equipped with like blades 19 and 21. The arcuate knives 18 through 21 preferably are disposed concentrically surrounding the shaft socket on a sloping rearward angle so as to have a sliding cutting action in penetrating an animal body.

The adaptation of the arrow head seen in Fig. 5 shows the blade 10 equipped with barbed ends 30 and 31 adapted to hold the arrow head in the animal body whereas the embodiment seen in Fig. 1 is adapted with rounded or reversely sloping ends 32 and 33 assisting in the arrow head falling out of the animal body.

In operation when the arrow head strikes an animal body, the point 13 penetrates and the sharp edges 11 and 12 cut a slot in the body permitting the socket portion to enter the body more easily and then the arcuate knives 18 through 21 contact the body in an area radially outwardly of the socket portion defined by the socket members 16 and 17 and cut the animal body in an area removed from the socket and shaft portions of the arrow head so as to permit bleeding of the body from cuts which are not normally pluggable by the shaft and socket.

While the device has been shown and described with the arcuate knife portions 18 through 21 formed integral with the semi-circular socket members 16 and 17, it is considered within the purview of the invention to weld the knife portions 18 through 21 directly to the blade 10 or to a socket portion of an arrow head.

Although but a single embodiment of the invention has been shown and described in detail, it is obvious that many changes may be made in the size, shape, detail and arrangement of the various elements of the invention within the scope of the appended claim.

I claim:

An arrow head comprising a single flat substantially triangular blade having a sharp point and sharp side edges leading backwardly from said point and an interconnecting blunt edge side opposite to said point; said blade being notched out in its central area from a point spaced from said point and leading through said interconnecting blunt edge side for receiving an arrow shaft therein; paired like half-socket members together constituting a shaft full socket welded to said blade in overlying relationship to said blade notch; each said half socket member having two paired substantially quarter circle arc knife blades attached thereto leading from either side of said socket member and curving toward one another and spiralling upwardly toward said blunt side and terminating in barb-like points just short of contact, said quarter arc knife blade being on a substantial radius concentrically surrounding said shaft socket so as to cut a much larger hole in an animal body than occupied by an arrow shaft to facilitate profuse bleeding.

References Cited in the file of this patent
UNITED STATES PATENTS

| | | |
|---|---|---|
| 1,333,745 | Wescott | Mar. 16, 1920 |
| 1,604,713 | Norlund | Oct. 26, 1926 |
| 2,373,216 | Zwickey | Apr. 10, 1945 |
| 2,549,235 | Ramsey | Apr. 17, 1951 |
| 2,589,137 | Ramsey | Mar. 11, 1952 |